(12) United States Patent
Fukunaga

(10) Patent No.: US 11,588,368 B2
(45) Date of Patent: Feb. 21, 2023

(54) HOUSING FOR AN ELECTRIC MOTOR

(71) Applicant: Nidec Corporation, Kyoto (JP)

(72) Inventor: Keisuke Fukunaga, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 0 days.

(21) Appl. No.: 17/564,380

(22) Filed: Dec. 29, 2021

(65) Prior Publication Data

US 2022/0123621 A1 Apr. 21, 2022

Related U.S. Application Data

(63) Continuation of application No. 16/484,127, filed as application No. PCT/JP2018/008789 on Mar. 7, 2018, now Pat. No. 11,239,722.

(30) Foreign Application Priority Data

Mar. 8, 2017 (DE) .......................... 102017104892.8

(51) Int. Cl.
*H02K 5/16* (2006.01)

(52) U.S. Cl.
CPC ......... *H02K 5/165* (2013.01); *H02K 2207/03* (2013.01)

(58) Field of Classification Search
CPC ........ H02K 2207/03; H02K 5/04; H02K 5/15; H02K 5/161; H02K 5/165; H02K 5/1732; A47K 2201/02; A47K 5/05
See application file for complete search history.

(56) References Cited

U.S. PATENT DOCUMENTS

| | | | |
|---|---|---|---|
| 2003/0035716 A1* | 2/2003 | Tanaka ................... | H02K 5/161 415/110 |
| 2012/0068559 A1* | 3/2012 | Nakamura .............. | F04C 23/02 464/178 |

FOREIGN PATENT DOCUMENTS

JP          5126414 B2 *    1/2013    ............... H02K 1/28

OTHER PUBLICATIONS

Fukunaga, "A Housing for an Electric Motor", U.S. Appl. No. 16/484,127, filed Aug. 7, 2019.

* cited by examiner

*Primary Examiner* — Naishadh N Desai
(74) *Attorney, Agent, or Firm* — Keating & Bennett

(57) ABSTRACT

An electric motor includes a housing with a tubular wall extending in an axial direction of the housing and a closures positioned at opposite axial ends of the tubular wall, a stator fixedly mounted inside of the housing, a rotor rotatably mounted inside of the housing, and a bearing rotatably supporting the rotor. At least one of the closures includes a rotor supporting portion. The rotor supporting portion includes a through hole configured to receive a portion of the rotor. The through hole has a triangular or polygonal shape, and a radius of an inscribed circle of the triangular or polygonal shape of the through hole is larger than a radius of the portion of the rotor received in the through hole.

10 Claims, 6 Drawing Sheets

HOUSING FOR AN ELECTRIC MOTOR

CROSS REFERENCE TO RELATED APPLICATIONS

This is a Continuation of U.S. application Ser. No. 16/484,127, which was filed on Aug. 7, 2019 as a U.S. national stage of PCT Application No. PCT/JP2018/008789, filed on Mar. 7, 2018, and with priority under 35 U.S.C. § 119(a) and 35 U.S.C. § 365(b) being claimed from German Application No. 102017104892.8, filed Mar. 8, 2017, the entire disclosures of each application are hereby incorporated herein by reference.

1. FIELD OF THE INVENTION

Various example embodiments relate generally to a housing for an electric motor.

2. BACKGROUND

Electric motors have gained significant importance in driving systems employed in mobile environments such as in vehicles. In driving systems of this kind, the volume of an electric motor is a key parameter that is subject to permanent optimization. The volumes of electric motors are determined inter alia by their housings.

SUMMARY

In view of the above, example embodiments of the present disclosure provide housings for electric motors each having a compact structure.

According to an example embodiment of the present disclosure, an electric motor includes a housing including a tubular wall extending in an axial direction of the housing and closures positioned at opposite axial ends of the tubular wall, a stator fixedly mounted inside of the housing, a rotor rotatably mounted inside of the housing, a bearing rotatably supporting the rotor, wherein at least one of the closures includes a rotor supporting portion that includes a through hole to receive a portion of the rotor, the through hole has a triangular or polygonal shape, and a radius of an inscribed circle of the triangular or polygonal shape of the through hole is larger than a radius of the portion of the rotor received in the through hole.

The above and other elements, features, steps, characteristics and advantages of the present disclosure will become more apparent from the following detailed description of the example embodiments with reference to the attached drawings.

DETAILED DESCRIPTION

The following detailed description refers to the accompanying drawings that show, by way of illustration, specific details and example embodiments in which the disclosure may be practiced.

The word "exemplary" is used herein to mean "serving as an example, instance, or illustration". Any example embodiment or design described herein as "exemplary" is not necessarily to be construed as preferred or advantageous over other example embodiments or designs.

Figure 1:
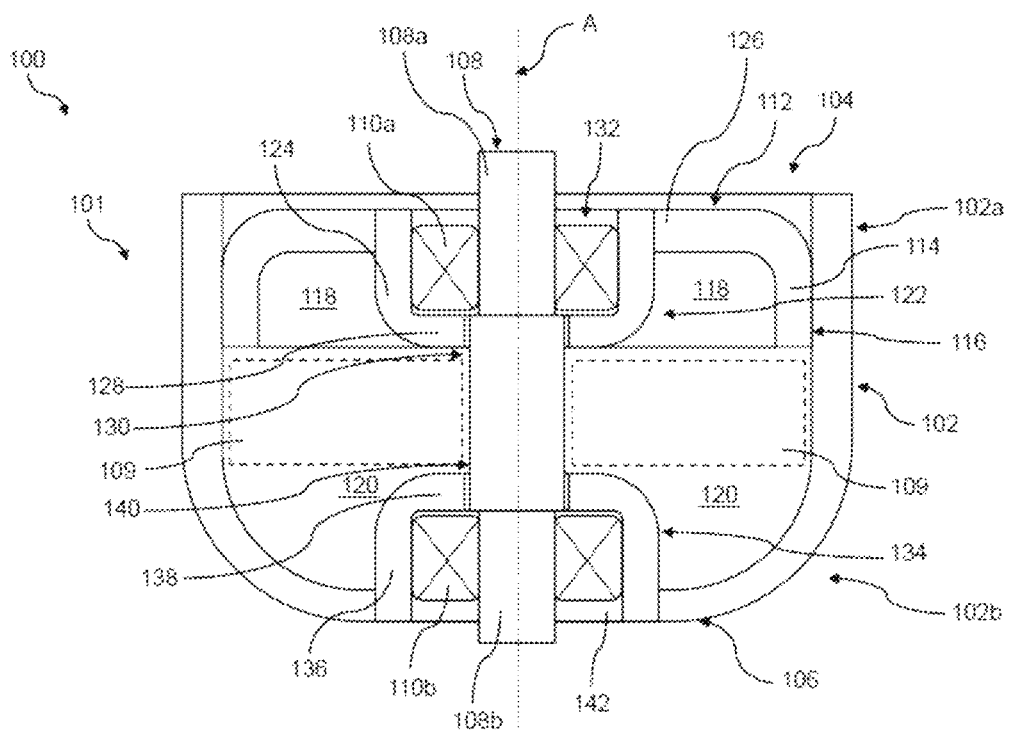
FIG. 1 shows a schematic view of a housing for an electric motor according to a first example embodiment of the present disclosure.

FIG. 1 shows an exemplary housing 100 for an electric motor according to a first example embodiment of the present disclosure. The housing 100 includes: a tubular wall 102 extending in an axial direction A of the housing 100, and closures 104, 106 respectively positioned at opposite axial ends 102*a*, 102*b* of the tubular wall 102 and configured to rotatably support respective opposite axial end portions 108*a*, 108*b* of a rotor 108, e.g., by means of respective bearings 110*a*, 110*b*. One of the closures 104 is formed separately from the tubular wall 102 and includes a radially inner portion 112 and a radially outer flange 114 that, in an assembled state, is in physical contact with a radially inner surface 116 of the tubular wall 102 and extends from the radially inner portion 112 of the separately formed closure 104 towards the opposite axial end 102*b* of the tubular wall 102.

In a housing 100 according to the present disclosure, the space in the interior of the tubular wall 102 occupied by the separately formed closure 104 is minimized, since the flange 114 extends from the radially inner portion 112 towards the opposite axial end 102*b* of the tubular wall 102. In this way, the space 118 surrounded by the flange 114 of the separately formed closure 104 and delimited by the radially inner portion 112 of the separately formed closure 104 is open to the interior space 120 defined by the tubular wall 102 and may be, hence, utilized for accommodating parts of an electric motor such as wiring or at least a part of an electronic circuits (not shown in the figures). In this way, the interior space 120 defined by the tubular wall 102 may be efficiently utilized. Consequently, a compact housing 100 may be provided in this way.

In the example embodiment shown in FIG. 1, only one closure 104 is formed separately from the tubular wall 102, while the other closure 106 is formed integrally with the tubular wall 102. However, it is understood that both closures 104, 106 may be formed separately from the tubular wall 102.

The separately formed closure 104 may be press fit into the interior of the tubular wall 102. In this way, no additional coupling means are required providing a housing 100 with a simple overall setup.

The axial end 102*a* of the tubular wall 102 configured to receive the separately formed closure 104 therein may have an inner diameter that increases with increasing axial distance form the opposite axial end 102*b*. In this way, the separately formed closure 104 may be easily inserted into the tubular wall 102 and brought into press fit engagement with the radially inner surface 116 of the tubular wall 102. Alternatively or additionally, the separately formed closure 104 may have an outer diameter that increases with increasing axial distance from its radially inner portion 112, i.e. with decreasing distance from the integrally formed closure 106 in the assembled state of the separately formed closure 104. This specific configuration can be achieved by manufacturing the separately formed closure 104 by press forming or deep drawing. The increasing outer diameter of the separately formed closure 104 may be a result of intrinsic resilient forces of the material of the separately formed closure 104. The tubular wall 102 may also be formed by press forming or deep drawing.

By means of the above configuration, the flange 114 of the separately formed closure 104 may be formed with an outer diameter, at least at its axial end opposite to its end connected to the radially inner portion 112, that is larger than an inner diameter of an axial portion of the tubular wall 102 in a state in which the separately formed closure 104 is separated from the tubular wall 102. In this way, the separately formed closure 104 can be securely fixed to the tubular wall 102. More specifically, a high static frictional force can be provided between an outer circumferential edge of the flange 114 of the separately formed closure 104 and the tubular wall 102 when the separately formed closure 104 is inserted into the tubular wall 102 as shown in FIG. 1.

Hence, by means of a such configured tubular wall 102 and/or separately formed closure 104, a high force can be exerted between the separately formed closure 104 and the inner surface 116 of the tubular wall 102 in the assembled state of the separately formed closure 104, in particular in case of small contact areas. Consequently, the flange 114 of the separately formed closure 104 may be provided with small axial dimensions, meaning that in the mounted state, the separately formed closure 104 occupies little space in the interior of the tubular wall 102. In this way, the housing 100 may be provided with small dimensions in the axial direction A and, hence, with a compact structure.

As indicated in FIG. 1, the radially inner portion 112 of the separately formed closure 104 may include a rotor supporting portion 122 configured to rotatably support the axial end portion 108a of the rotor 108 by means of the bearing 110a. The rotor supporting portion 122 may include an annularly shaped circumferential wall 124 extending in the axial direction A of the housing 100 and configured to receive the bearing 110a therein for rotatably supporting the axial end portion 108a of the rotor 108. The annularly shaped circumferential wall 124 may be integrally connected to the flange 114 by means of a connection portion 126 of the radially inner portion 112. In the example embodiment shown in FIG. 1, the connection portion 126 extends substantially in the radial direction of the housing 100.

As shown in FIG. 1, the circumferential wall 124 may be in the assembled state of the separately formed closure 104 substantially parallel to the flange 114 and may extend from the connection portion 126 towards the opposite axial end 102b of the tubular wall 102. By means of a circumferential wall 124 of this kind, a radial force may be exerted onto the bearing 110a in the assembled state of the separately formed closure 104. Consequently, the bearing 110 may be press fit into the rotor supporting portion 122, meaning that no additional fixing means are required.

The rotor supporting portion 122 of the separately formed closure 104 may include an axial end wall 128 including a through hole 130 extending in the axial direction A and configured to receive the rotor 108 therein. The axial end wall 128 may be formed at an axial end of the circumferential wall 124 facing the respective other closure 106, i.e. the integrally formed closure 106 in the example embodiment shown in FIG. 1. The axial end wall 128 of the rotor supporting portion 122 may serve as a positioner for positioning the bearing 110a in the axial direction A.

As shown in FIG. 1, a bearing insertion opening 132 may be formed at an axial end of the circumferential wall 124 opposite to the axial end wall 128 of the rotor supporting portion 122. By means of this configuration, the bearing insertion opening 132 is visible from the exterior of the housing 100, i.e. the bearing 110a may be easily inserted into the rotor supporting portion 122.

The integrally formed closure 106 may include a rotor supporting portion 134 configured to rotatably support an axial end portion 108b of the rotor 108 by means of a bearing 110b. The rotor supporting portion 134 of the integrally formed closure 106 may also include an annularly shaped circumferential wall 136 extending in the axial direction A and configured to receive the respective bearing 110b therein for rotatably supporting the respective axial end portion 108b of the rotor 108.

The circumferential wall 136 of the rotor supporting portion 134 of the integrally formed closure 106 may be provided with an axial end wall 138 at an axial end thereof facing the separately formed closure 104. The axial end wall 138 may be provided with a through hole 140 extending in the axial direction A and configured to receive the rotor 108 therein.

As shown in FIG. 1, a bearing insertion opening 142 may be formed at an axial end of the circumferential wall 136 opposite to the axial end wall 138 of the rotor supporting portion 134. By means of this configuration, the bearing insertion opening 142 is visible from the exterior of the housing 100, i.e. the bearing 110b may be easily inserted into the rotor supporting portion 134.

Figure 5:
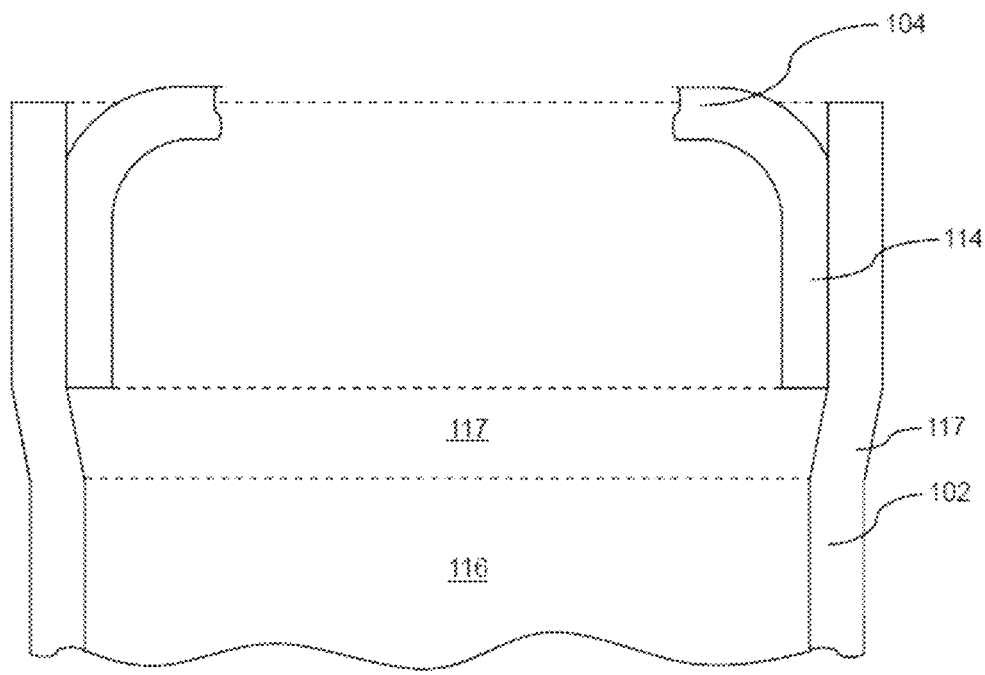
FIG. 5 shows an enlarged sectional view of a portion of a tubular wall of a housing for an electric motor.

As indicated in FIG. 5, the radially inner surface 116 of the tubular wall 102 may include a positioner 117 configured to be brought into physical contact with the flange 114 of the separately formed closure 104. The positioner 117 may, hence, serve as a positioner for positioning the separately formed closure 104 in a defined axial position in the interior of the tubular wall 102.

In the example embodiment shown in FIG. 5, the positioner 117 may be configured as a step extending in the circumferential direction of the tubular wall 102 and protruding radially inwardly with respect to the axial end 102a of the tubular wall 102 configured to receive the separately formed closure 104. The step 117 may continuously extend in the circumferential direction of the tubular wall 102. By means of a positioner 117 of this kind, the entire circumference of the separately formed closure 104 may be positioned in the interior of the tubular wall 102 in a well-defined axial position.

The through hole 130 of the separately formed closure 104 and/or the through hole 140 of the integrally formed closure 106 may be provided with a non-rotationally symmetric shape such as a triangular or polygonal shape. Due to the non-rotationally symmetric shape of the through hole 130 of the separately formed closure 104 and/or the through hole 140 of the integrally formed closure 106, one or both axial end portions 108a, 108b of the rotor 108 can be held substantially at the center of the respective through holes 130, 140 even before inserting the bearing 110a into the bearing insertion opening 132 of the separately formed closure 104 and/or the bearing 110b into the bearing insertion opening 142 of the integrally formed closure 106. In this way, the bearings 110a and 110b can be mounted independently of one another into the respective bearing insertion openings 132, 142 of the separately formed closure 104 and the integrally formed closure 106, respectively, and onto the opposite axial end portions 108a, 108b of the rotor 108. This in turn offers the opportunity of measuring forces occurring during the assembly of a bearing 110a, 110b onto an axial end 108a, 108b of the rotor 108 independently of the respective other bearing 110a, 110b and, hence, very precisely in order to prevent, e.g., a plastic deformation of the housing 100 during assembly caused by excessive forces exerted thereon. An independent measurement of forces is not possible in case the bearings 110a, 110b are mounted onto the opposite axial ends of the rotor 108 simultaneously which would be necessary, if none of the through holes 130, 140 was provided with a non-rotationally symmetric shape. Consequently, due to the non-rotationally shape of the through hole 130 of the separately formed closure 104 and/or of the through hole 140 of the integrally formed closure 106, the assembly of the rotor 108 into the housing 100 can be performed in a simple way, since no further means are required for keeping the rotor 108 in a central position with respect to the tubular wall 102 during assembly.

Figure 6:
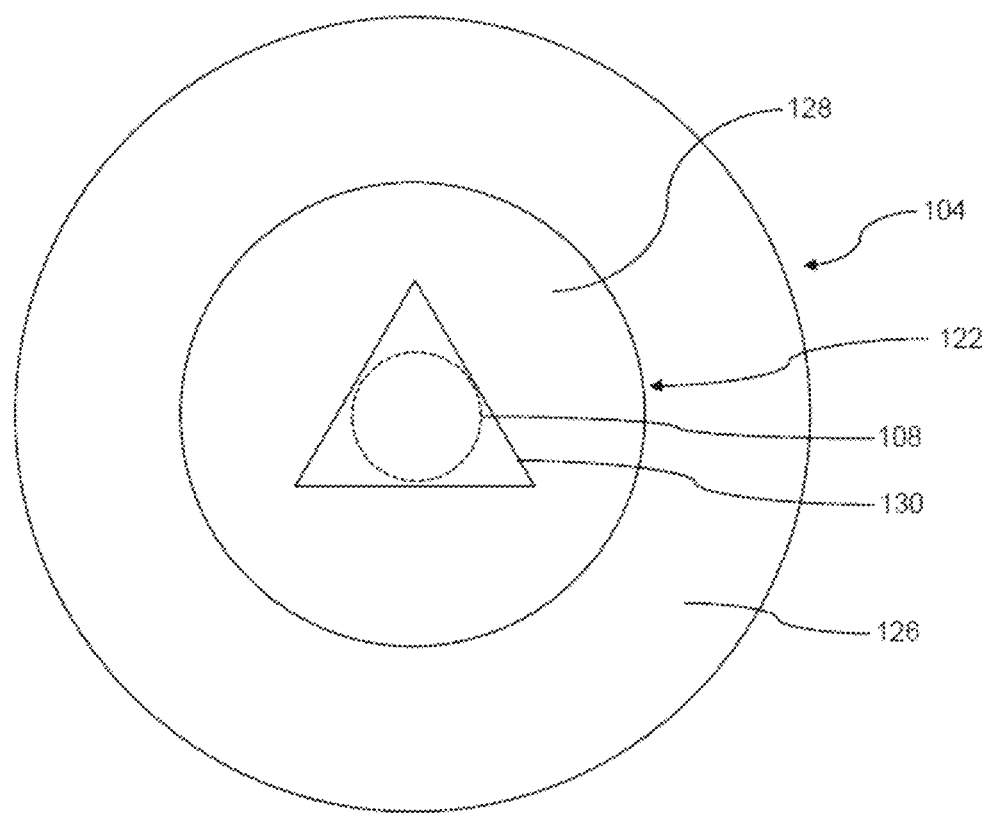
FIG. 6 is a top view of the housing shown in FIG. 1.

A top view of the separately formed closure 104 is shown in FIG. 6. For reasons of simplicity, the bearing 110a is omitted in FIG. 6.

As shown in this figure, the through hole 130 may be provided with the shape of an isosceles triangle configured to receive the rotor 108 therein, meaning that the radius of the inscribed circle of the triangular through hole 130 is slightly larger than the radius of the portion of the rotor 108 received in the through hole 130.

A through hole with a non-rotationally symmetric shape may also serve as a positioner, e.g., for positioning the respective closure in a defined rotational position on a production band. In this way, the closures 104, 106 or the closures 104, 106 and the tubular wall 102 may be machined at defined and/or mutually corresponding positions in the circumferential direction.

Figure 2:
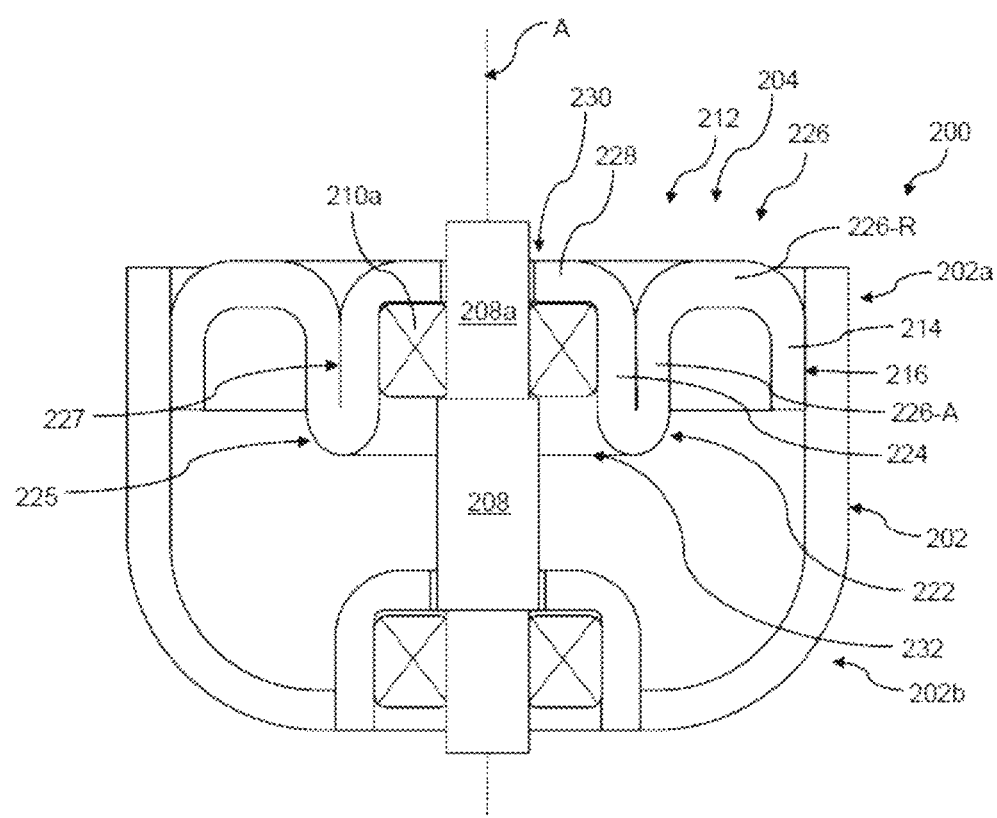
FIG. 2 shows a schematic view of a housing for an electric motor according to a second example embodiment of the present disclosure.

In FIG. 2, a housing for an electric motor according to a second example embodiment is shown. The second example embodiment will be described only inasmuch as it differs from the first example embodiment shown in FIG. 1. In FIG. 2, parts corresponding to parts of the housing 100 shown in FIG. 1 will be denoted by the same reference numerals, however, enhanced by the number 100.

The exemplary housing 200 according to the second example embodiment differs from the housing 100 shown in FIG. 1 in view of the configuration of the separately formed closure 204, i.e. of the closure 204 formed separately from the tubular wall 202. The separately formed closure 204 includes a radially inner portion 212 and a radially outer flange 214 that, in an assembled state, is in physical contact with a radially inner surface 216 of an axial end 202a of the tubular wall 202 and extends from the radially inner portion 212 of the separately formed closure 204 towards the opposite axial end 202b of the tubular wall 202.

The radially inner portion 212 includes a rotor supporting portion 222 rotatably supporting an axial end portion 208a of a rotor 208 by means of a bearing 210a. The rotor supporting portion 222 may be integrally connected to the flange 214 by means of a connection portion 226.

As shown in FIG. 2, the rotor supporting portion 222 may include an annularly shaped circumferential wall 224 extending in the axial direction A and an axial end wall 228 including a through hole 230 configured to receive an axial end portion 208a of the rotor 208 therein. A bearing insertion opening 232 is formed at an axial end of the rotor supporting portion 222 opposite to the axial end wall 228.

In contrast to the first example embodiment shown in FIG. 1, the axial end wall 228 of the rotor supporting portion 222 is connected to the circumferential wall 224 thereof at an axial end portion opposite to the opposite axial end 202b of the tubular wall 202, meaning that in an assembled state of the separately formed closure 204, the bearing 210a is not accessible from the exterior of the housing 200. In this way, the axial end wall 228 may serve as a protection means for the bearing 210a against external factors such as moisture, dirt, or mechanical impacts.

In addition, different from the first example embodiment shown in FIG. 1, the connection portion 226 of the radially inner portion 212 is connected to an axial end portion of the circumferential wall 224 facing the opposite axial end 202b of the tubular wall 202, i.e. opposite to the axial end wall 228. Consequently, different from the connection portion 126 of the first example embodiment, the connection portion 226 of the separately formed closure 204 of the housing 200 according to the second example embodiment includes a substantially radially extending portion 226-R and a substantially axially extending portion 226-A. The axially extending portion 226-A of the connection portion 226 and the circumferential wall 224 of the rotor supporting portion 222 may be substantially co-extensive in the axial direction A.

The circumferential wall 224 and the axially extending portion 226-A of the connection portion 226 may form a biasing member having a V-shaped cross sectional configuration in a state in which the separately formed closure 204 is separated from the tubular wall 202, meaning that the circumferential wall 224 and the axially extending portion 226-A of the connection portion 226 are connected to each other only at an axial end 225 opposite to the axial end wall 228. The biasing member may be compressed by a radially inward force, e.g. by a radially inward force applied onto the separately formed closure 204 when inserting the separately formed closure 204 into the tubular wall 202. By means of this force, the circumferential wall 224 and the axially extending portion 226-A of the connection portion 226 may be brought into mutual physical contact along a contact surface 227 of the circumferential wall 224. Consequently, in the assembled state of the separately formed closure 204, the biasing member is compressed and may thus exert a force in a radially outward direction onto the radially inner surface 216 of the tubular wall 202 by means of the flange 214, thereby enhancing the press fit engagement force as compared to the first example embodiment.

Figure 3:
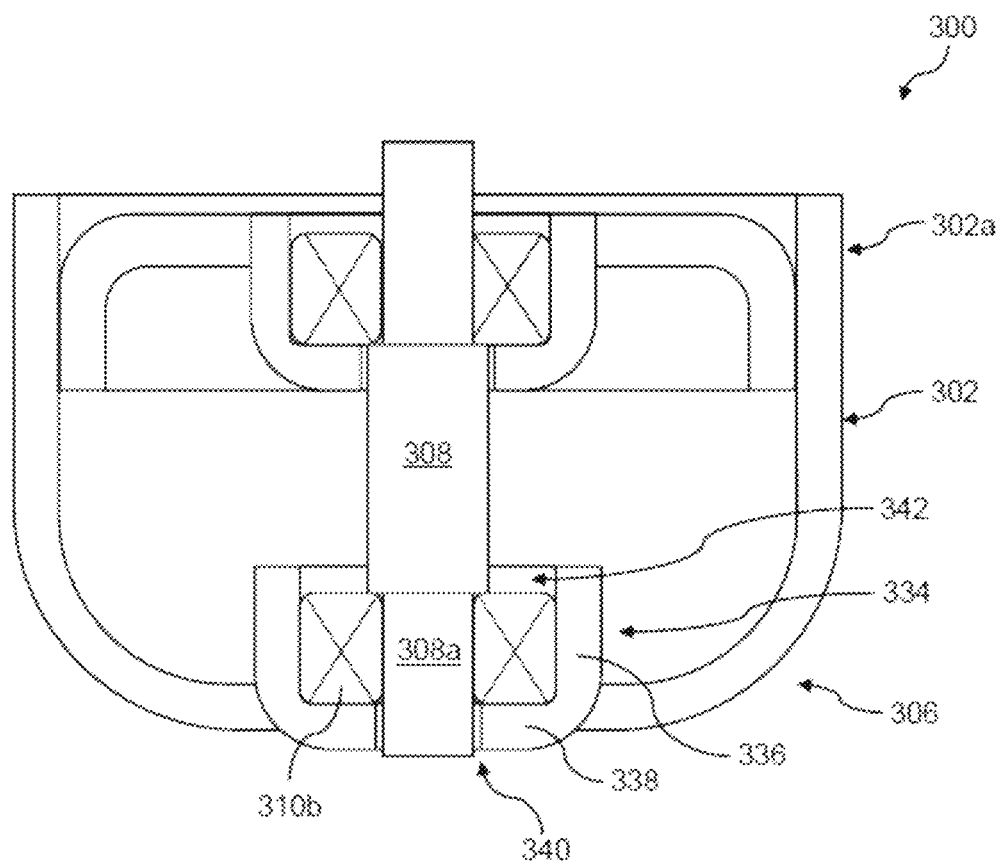
FIG. 3 shows a schematic view of a housing for an electric motor according to a third example embodiment of the present disclosure.

In FIG. 3, a housing for an electric motor according to a third example embodiment is shown. The third example embodiment will be described only inasmuch as it differs from the first example embodiment shown in FIG. 1. In FIG. 3, parts corresponding to parts of the housing 100 shown in FIG. 1 will be denoted by the same reference numerals, however, enhanced by the number 200.

The housing 300 shown in FIG. 3 differs from the housing 100 according to the first example embodiment in view of the configuration of the closure 306 integrally formed with the tubular wall 302.

Similar to the housing 100 according to the first example embodiment, the integrally formed closure 306 also includes a rotor supporting portion 334 configured to rotatably support a rotor 308 by means of a bearing 310b. The rotor supporting portion 334 includes a circumferential wall 336 as well as an axial end wall 338 including a through hole 340 configured to receive an axial end portion 308b of the rotor 308 therein. Opposite to the axial end wall 338 a bearing insertion opening 342 is provided.

Different from the first example embodiment, the axial end wall 338 is provided at an axial end of the rotor supporting portion 334 opposite to the opposite axial end 302a of the tubular wall 302, meaning that in an assembled state the bearing 310b is not accessible from the exterior of the housing 300. In this way, the axial end wall 338 may serve as a protection means for the bearing 310b against external factors such as moisture, dirt, or mechanical impacts.

Figure 4:
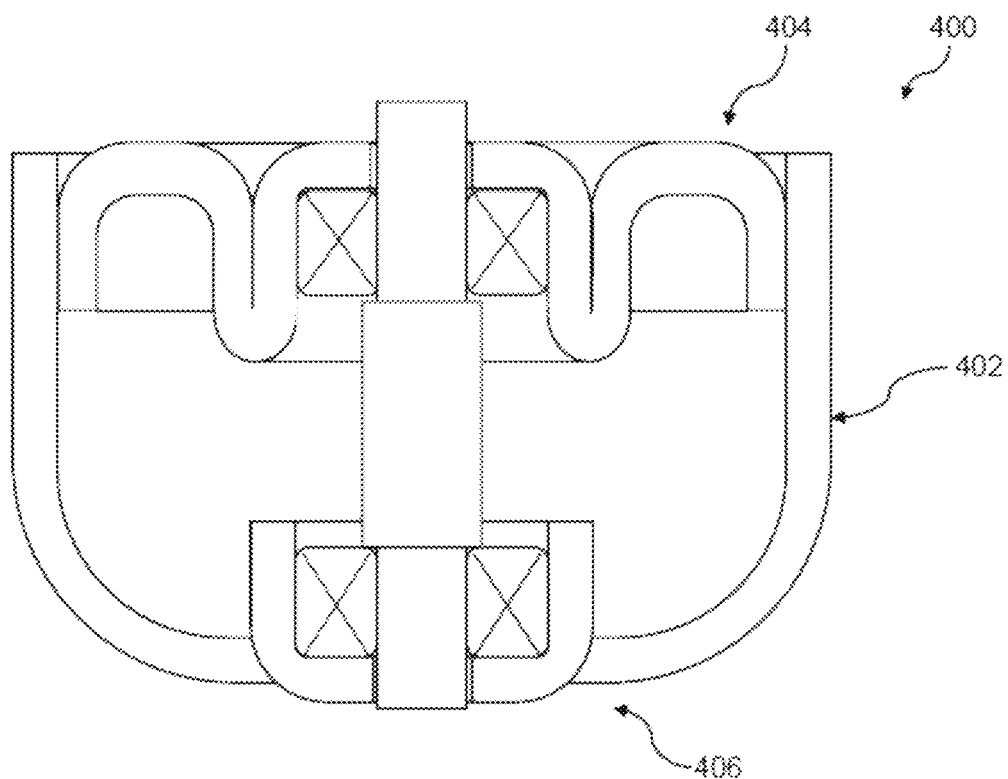
FIG. 4 shows a schematic view of a housing for an electric motor according to a fourth example embodiment of the present disclosure.

In FIG. 4, a housing for an electric motor according to a fourth example embodiment is shown. The fourth example embodiment will be described only inasmuch as it differs from the first example embodiment shown in FIG. 1. In FIG. 4, parts corresponding to parts of the housing 100 shown in FIG. 1 will be denoted by the same reference numerals, however, enhanced by the number 300.

The housing 400 shown in FIG. 4 includes, similar to the housing 100 shown in FIG. 1, a tubular wall 402 with a closure 404 formed separately from the tubular wall 402 and a closure 406 formed integrally with the tubular wall 402. The housing 400 shown in FIG. 4 differs from the housing 100 according to the first example embodiment in view of both the separately formed closure 404 and the integrally formed closure 406. More specifically, the housing 400 according to the fourth example embodiment includes a separately formed closure 406 according to the second example embodiment shown in FIG. 2 and an integrally formed closure 406 according to the third example embodiment shown in FIG. 3. The respective closures have been described above in detail. Therefore, a detailed description of the closures 404 and 406 of the housing 400 according to the fourth example embodiment will be omitted here.

The housings 100 to 400 described above may be employed in an electric motor including a stator fixedly mounted inside of a housing 100 to 400 and configured to generate a time-varying magnetic field. The rotors shown in the figures may be at least temporarily or even permanently magnetized and may be rotatable by means of a magnetic interaction with the time-varying magnetic field generated by the stator.

An exemplary electric motor 101 is indicated in FIG. 1. This motor 101 includes the previously discussed housing 100, the rotor 108, and a stator 109 mounted in the interior space 120 of the housing 100.

An electric motor of this kind may be employed in an electric pump configured to convey, e.g. a service liquid in a vehicle such as lubricating oil or a coolant.

In the following, various examples of the present disclosure will be described.

Example 1 is a housing for an electric motor. The housing includes: a tubular wall extending in an axial direction of the housing, and closures positioned at opposite axial ends of the tubular wall and configured to rotatably support opposite axial end portions of a rotor. At least one of the closures is formed separately from the tubular wall and includes a radially inner portion and a radially outer flange that, in an assembled state, is in physical contact with a radially inner surface of the tubular wall and extends from the radially inner portion of the separately formed closure towards the opposite axial end of the tubular wall.

In Example 2, the subject matter of Example 1 can optionally further include that the radially inner portion of the separately formed closure includes a rotor supporting portion configured to rotatably support an axial end portion of a rotor by means of a bearing. The rotor supporting portion may include an annularly shaped circumferential wall extending in the axial direction of the housing and configured to receive a bearing therein for rotatably supporting an axial end portion of the rotor.

In Example 3, the subject matter of Example 2 can optionally further include that the rotor supporting portion of the separately formed closure includes an axial end wall including a through hole extending in the axial direction and configured to receive the rotor therein. The axial end wall may be formed at an axial end of the circumferential wall facing the respective other closure or opposite to the respective other closure.

In Example 4, the subject matter of Example 3 can optionally further include that the rotor supporting portion of the separately formed closure includes a bearing insertion opening at an axial end thereof opposite to the axial end wall.

In Example 5, the subject matter of any one of Examples 3 or 4 can optionally further include that the radially inner portion includes a connection portion integrally connecting the flange with an axial end portion of the circumferential wall opposite to the axial end wall.

In Example 6, the subject matter of any one of Examples 3 to 5 can optionally further include that the through hole is provided with a non-rotationally symmetric shape such as a triangular or polygonal shape.

In Example 7, the subject matter of any one of Examples 1 to 6 can optionally further include that one of the closures is integrally formed with the tubular wall.

In Example 8, the subject matter of Example 7 can optionally further include that the closure integrally formed with the tubular wall includes a rotor supporting portion configured to rotatably support an axial end portion of a rotor by means of a bearing. The rotor supporting portion of the integrally formed closure may include an annularly shaped circumferential wall extending in the axial direction and configured to receive a bearing therein for rotatably supporting an axial end portion of the rotor.

In Example 9, the subject matter of Example 8 can optionally further include that the rotor supporting portion of the integrally formed closure includes an axial end wall including a through hole extending in the axial direction and configured to receive the rotor therein. The axial end wall may be formed at an axial end of the circumferential wall facing or opposite to the closure separately formed from the tubular wall.

In Example 10, the subject matter of Example 9 can optionally further include that the rotor supporting portion of the integrally formed closure includes a bearing insertion opening at an axial end thereof opposite to the axial end wall.

In Example 11, the subject matter of any one of Examples 9 or 10 can optionally further include that the through hole is provided with a non-rotationally symmetric shape such as a triangular or polygonal shape.

In Example 12, the subject matter of any one of Examples 1 to 11 can optionally further include that the closure separately formed from the tubular wall is press fit into the interior of an axial end portion of the tubular wall.

In Example 13, the subject matter of any one of Examples 1 to 12 can optionally further include that the inner surface of the tubular wall includes a positioner configured to be brought into physical contact with the flange of the separately formed closure.

In Example 14, the subject matter of Example 13 can optionally further include that the positioner is configured as or includes a step extending in the circumferential direction of the tubular wall and protruding radially inwardly.

In Example 15, the subject matter of any one of Examples 1 to 14 can optionally further include that at least one of the closures and/or the tubular wall is/are formed by press forming and/or deep drawing.

Example 16 is an electric motor including: a housing of any one of Examples 1 to 15, a stator fixedly mounted inside of the housing and configured to generate a time-varying magnetic field, and a rotor rotatably mounted inside of the housing and configured to be rotated by an interaction with the time-varying magnetic field generated by the stator.

Features of the above-described preferred example embodiments and the modifications thereof may be combined appropriately as long as no conflict arises.

While example embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

What is claimed is:

1. An electric motor comprising:
  a housing including a tubular wall extending in an axial direction of the housing and closures positioned at opposite axial ends of the tubular wall;
  a stator fixedly mounted inside of the housing;
  a rotor rotatably mounted inside of the housing;
  a bearing rotatably supporting the rotor; wherein
  at least one of the closures includes a rotor supporting portion that includes a through hole to receive a portion of the rotor;
  the through hole has a triangular or polygonal shape; and
  a radius of an inscribed circle of the triangular or polygonal shape of the through hole is larger than a radius of the portion of the rotor received in the through hole.

2. The electric motor of claim 1, wherein the closures at both axial ends of the tubular wall include the rotor supporting portions having the triangular or polygonal shape.

3. The electric motor of claim 1, wherein the through hole is provided with a non-rotationally symmetric shape.

4. The electric motor of claim 1, wherein
  at least one of the closures is separate from the tubular wall, and includes a radially inner portion which includes the rotor supporting portion and a radially outer flange which is in physical contact with a radially inner surface of the tubular wall and extends from the radially inner portion of the closure towards an of the tubular wall.

5. The electric motor of claim 4, wherein the radially inner portion of the at least one of the closures which is separate from the tubular wall includes:
  a rotor supporting portion including an annularly shaped circumferential wall extending in the axial direction;
  an axial end wall including the through hole;
  a bearing insertion opening at an axial end thereof opposite to the axial end wall;
  the axial end wall is provided at an end on an outer side of the housing with respect to the annularly shaped circumferential wall; and
  the bearing insertion opening is provided at the axial end on an inner side of the housing with respect to the annularly shaped circumferential wall.

6. The electric motor of claim 5, wherein
  the radially inner portion includes a connection portion integrally connecting the radially outer flange with an axial end portion of the circumferential wall opposite to the axial end wall;
  the connection portion includes a substantially radially extending portion and a substantially axially extending portion;
  the substantially radially extending portion connects the radially outer flange and extends radially; and
  the substantially axially extending portion connects the substantially axially extending portion and the annularly shaped circumferential wall, and extends axially.

7. The electric motor of claim 4, wherein
  the radially inner surface of the tubular wall includes a positioner to be brought into physical contact with the radially outer flange of the at least one of the closures which is separate from the tubular wall;
  the positioner includes a step extending in the circumferential direction of the tubular wall and protruding radially inwardly.

8. The electric motor of claim 1, wherein one of the closures is integral with the tubular wall.

9. The electric motor of claim 8, wherein the rotor supporting portion of the one of the closures integral with the tubular wall includes a circumferential wall extending in the axial direction to receive the bearing therein to rotatably support an axial end portion of the rotor.

10. The electric motor of claim 9, wherein
  the rotor supporting portion of the one of the closures integral with the tubular wall includes an axial end wall including the through hole, and a bearing insertion opening into which the bearing is inserted;
  the axial end wall is located at an axial end on an inner side of the housing with respect to the circumferential wall; and
  the bearing insertion opening is located at an axial end on an outer side of the housing with respect to the circumferential wall.

* * * * *